(12) United States Patent
Toudeh-Fallah et al.

(10) Patent No.: US 11,394,537 B2
(45) Date of Patent: Jul. 19, 2022

(54) HOMOMORPHIC ENCRYPTION WITH QUANTUM KEY DISTRIBUTION ENCAPSULATION

(71) Applicant: JPMorgan Chase Bank, N.A., New York, NY (US)

(72) Inventors: Farzam Toudeh-Fallah, Galena, OH (US); Marco Pistoia, Amawalk, NY (US); Antigoni Ourania Polychroniadou, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/114,927

(22) Filed: Dec. 8, 2020

(65) Prior Publication Data

US 2022/0131690 A1 Apr. 28, 2022

Related U.S. Application Data

(60) Provisional application No. 63/106,139, filed on Oct. 27, 2020.

(51) Int. Cl.
*H04L 29/06* (2006.01)
*H04L 9/08* (2006.01)
(Continued)

(52) U.S. Cl.
CPC ............ *H04L 9/0858* (2013.01); *H04L 9/008* (2013.01); *H04L 63/0478* (2013.01)

(58) Field of Classification Search
CPC .... H04L 9/0858; H04L 63/0478; H04L 9/008
See application file for complete search history.

(56) References Cited

U.S. PATENT DOCUMENTS 7,515,716 B1 * 4/2009 Elliott ................. H04L 9/0858
380/256
11,005,828 B1 * 5/2021 Kapp ....................... H04L 9/16
(Continued)

FOREIGN PATENT DOCUMENTS

JP 2017055335 A * 3/2017

OTHER PUBLICATIONS

Sasaki et al., "Quantum Key Distribution and Its Applications", IEEE Security & Privacy, vol. 16, Issue: 5, Year: Sep./Oct. 2018.*
(Continued)

*Primary Examiner* — Morshed Mehedi
(74) *Attorney, Agent, or Firm* — Greenblum & Bernstein, P.L.C.

(57) ABSTRACT

Systems and methods for processing and transmission of encrypted data are provided. The method includes: encrypting a first data set; encapsulating the encrypted first data set in a protective layer; and transmitting the encapsulated encrypted first data set to a destination over one or more communication channels. The encrypting is performed by using a homomorphic encryption (HE) technique. The encapsulating is performed by using a quantum key distribution (QKD) encapsulation technique to generate a QKD-protected layer. The communication channels may include a classical/non-quantum channel over which the QKD-encapsulated encrypted first set of data is transmitted and a quantum channel over which a quantum key distribution is conducted, or a single communication channel to conduct both.

18 Claims, 6 Drawing Sheets

(51) Int. Cl.
    *H04L 9/40*          (2022.01)
    *H04L 9/00*          (2022.01)

(56) References Cited

U.S. PATENT DOCUMENTS

2021/0083841 A1\* 3/2021 Tueno .................... H04L 9/008
2021/0099290 A1\* 4/2021 Tomlinson ............ H04L 9/0825

OTHER PUBLICATIONS

International Search Report and Written Opinion in International Application No. PCT/US2021/056084, dated Nov. 24, 2021.

\* cited by examiner

HE: Homomorphic Encryption
QKD: Quantum Key Distribution
HE-OP: Homomorphic Encryption-Based Operation

HOMOMORPHIC ENCRYPTION WITH QUANTUM KEY DISTRIBUTION ENCAPSULATION

CROSS-REFERENCE TO RELATED APPLICATIONS

This application claims priority from Greek Patent Application No. 20200100638, filed in the Greek Patent Office on Oct. 22, 2020, which is hereby incorporated by reference in its entirety.

This application claims the benefit of U.S. Provisional Patent Application Ser. No. 63/106,139, filed Oct. 27, 2020, which is hereby incorporated by reference in its entirety.

BACKGROUND

1. Field of the Disclosure

This technology generally relates to methods and systems for processing encrypted data, and more particularly, to methods and systems for using quantum key distribution (QKD) encapsulation with respect to homomorphic encryption.

2. Background Information

Homomorphic encryption allows data to be processed, analyzed, and/or operated on while in an encrypted format, thus protecting the privacy and security of the data during the operation. Conventionally, homomorphic encryption utilizes public key encryption through a transmission phase and a private key for decrypting the data after the operation is conducted.

Quantum key distribution (QKD) is a quantum encryption methodology which, instead of relying on algorithms, utilizes the principles of quantum mechanics to provide security for communication channels.

Public key encryption has a vulnerability with respect to quantum computers that may be able to compromise or break such an encryption method. Similarly, any other type of algorithm-based encryption has this same vulnerability with respect to quantum computers.

Accordingly, there is a need for a methodology that protects data against threats posed by quantum computers while preserving the homomorphic encryption layer.

SUMMARY

The present disclosure, through one or more of its various aspects, embodiments, and/or specific features or sub-components, provides, inter alia, various systems, servers, devices, methods, media, programs, and platforms for using quantum key distribution (QKD) encapsulation with respect to homomorphic encryption.

According to an aspect of the present disclosure, a method for processing encrypted data is provided. The method is implemented by at least one processor. The method includes: encrypting, by the at least one processor, a first data set; encapsulating, by the at least one processor, the encrypted first data set in a protective layer, and transmitting, by the at least one processor, the encapsulated encrypted first data set to a destination over at least one communication channel. The encrypting is performed by using a homomorphic encryption (HE) technique. The encapsulating is performed by using a quantum key distribution (QKD) encapsulation technique to generate a QKD-protected layer.

The method may further include: receiving, from the destination, an encapsulated encrypted second data set; decapsulating, by the at least one processor, the received encrypted second data set; and decrypting, by the least one processor, the decapsulated second data set.

The at least one communication channel may include a classical/non-quantum channel over which the QKD-encapsulated encrypted first data set is transmitted and a quantum channel over which a quantum key distribution is conducted.

The quantum key distribution may include at least one from among a polarization-encoded quantum key distribution, a phase-encoded quantum key distribution, a discrete-variable quantum key distribution, and a continuous variable quantum key distribution.

The at least one communication channel may include a single channel over which the QKD-encapsulated encrypted first data set is transmitted and over which a quantum key distribution is conducted.

The QKD encapsulation technique may include at least one from among a prepare-and-measure technique and an entanglement-based technique.

The encrypting may be performed by using at least one from among a fully homomorphic encryption technique, a partially homomorphic encryption technique, and a somewhat homomorphic encryption technique.

The at least one communication channel may include at least one from among a fiber-optic communication channel and a free space communication channel.

According to another exemplary embodiment, a computing apparatus for processing encrypted data is provided. The computing apparatus includes a processor; a memory; and a communication interface coupled to each of the processor and the memory. The processor is configured to encrypt a first data set by using a homomorphic encryption (HE) technique; encapsulate the encrypted first data set in a protective layer by using a quantum key distribution (QKD) encapsulation technique to generate a QKD-protected layer; and transmit, via the communication interface, the encapsulated encrypted first data set to a destination over at least one communication channel.

The processor may be further configured to receive, from the destination via the communication interface, an encapsulated encrypted second data set; decapsulate the received encrypted second data set; and decrypt the decapsulated second data set.

The at least one communication channel may include a classical/non-quantum channel over which the QKD-encapsulated encrypted first data set is transmitted and a quantum channel over which a quantum key distribution is conducted.

The quantum key distribution may include at least one from among a polarization-encoded quantum key distribution, a phase-encoded quantum key distribution, a discrete-variable quantum key distribution, and a continuous variable quantum key distribution.

The at least one communication channel may include a single channel over which the QKD-encapsulated encrypted first data set is transmitted and over which a quantum key distribution is conducted.

The QKD encapsulation technique may include at least one from among a prepare-and-measure technique and an entanglement-based technique.

The processor may be further configured to encrypt the first data set by using at least one from among a fully homomorphic encryption technique, a partially homomorphic encryption technique, and a somewhat homomorphic encryption technique.

The at least one communication channel may include at least one from among a fiber-optic communication channel and a free space communication channel.

According to yet another exemplary embodiment, a method for processing encrypted data is provided. The method is implemented by at least one processor. The method includes: receiving, by the at least one processor from a source, a first set of data that has been encrypted by using a homomorphic encryption (HE) technique and encapsulated by using a quantum key distribution (QKD) encapsulation technique; decapsulating, by the at least one processor, the encrypted first data set; executing, by the at least one processor, an HE-based operation on the encrypted first data set in order to generate an encrypted second data set; encapsulating, by the at least one processor, the encrypted second data set by using the QKD encapsulation technique; and transmitting, by the at least one processor to the source, the QKD-encapsulated encrypted second data set over at least one communication channel.

The at least one communication channel may include a classical/non-quantum channel over which the QKD-encapsulated encrypted second data set is transmitted and a quantum channel over which a quantum key distribution is conducted.

The quantum key distribution may include at least one from among a polarization-encoded quantum key distribution, a phase-encoded quantum key distribution, a discrete-variable quantum key distribution, and a continuous variable quantum key distribution.

The at least one communication channel may include a single channel over which the QKD-encapsulated encrypted second data set is transmitted and over which a quantum key distribution is conducted.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
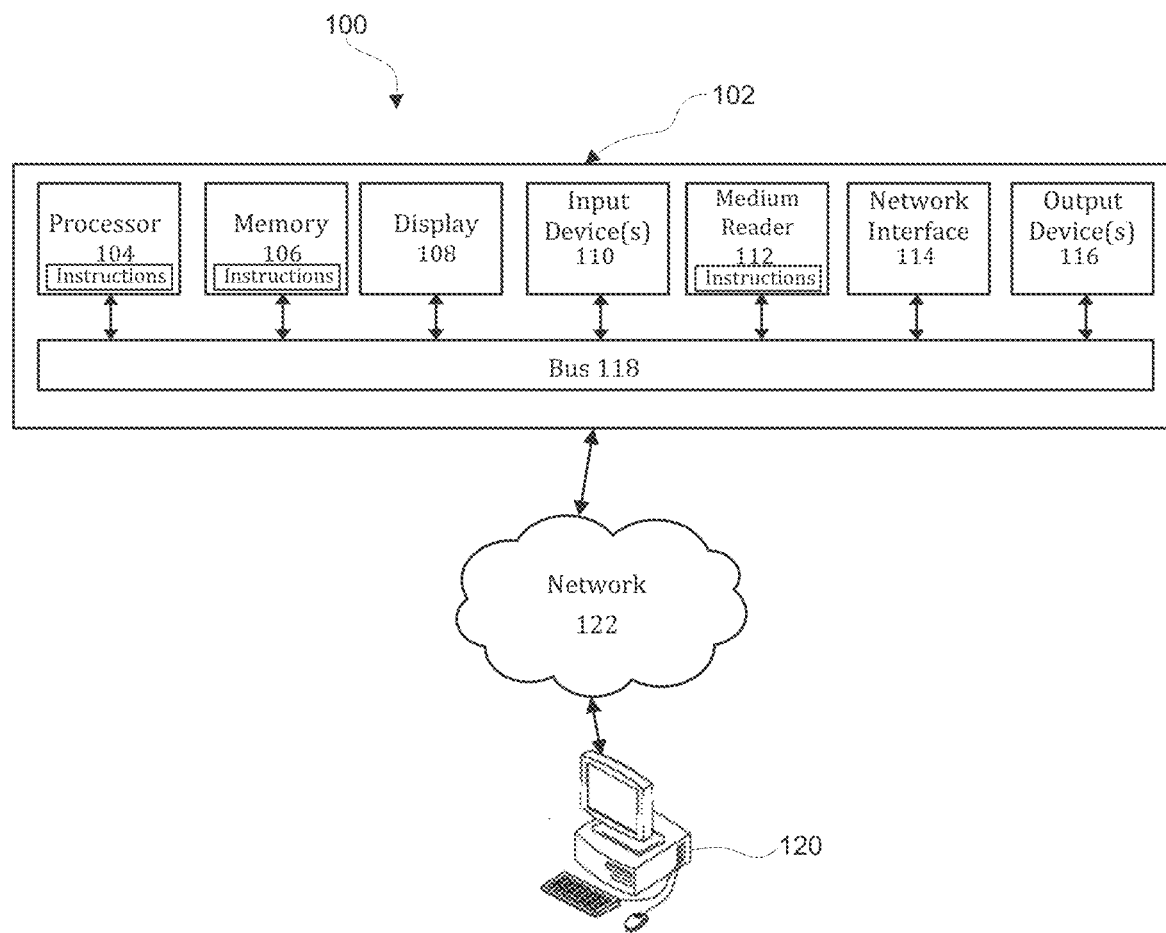
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. The processor 104 may include a quantum processor and/or a photonic processor. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. The computer memory 106 may include a quantum memory. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using quantum key distribution (QKD) encapsulation with respect to homomorphic encryption.

Figure 2:
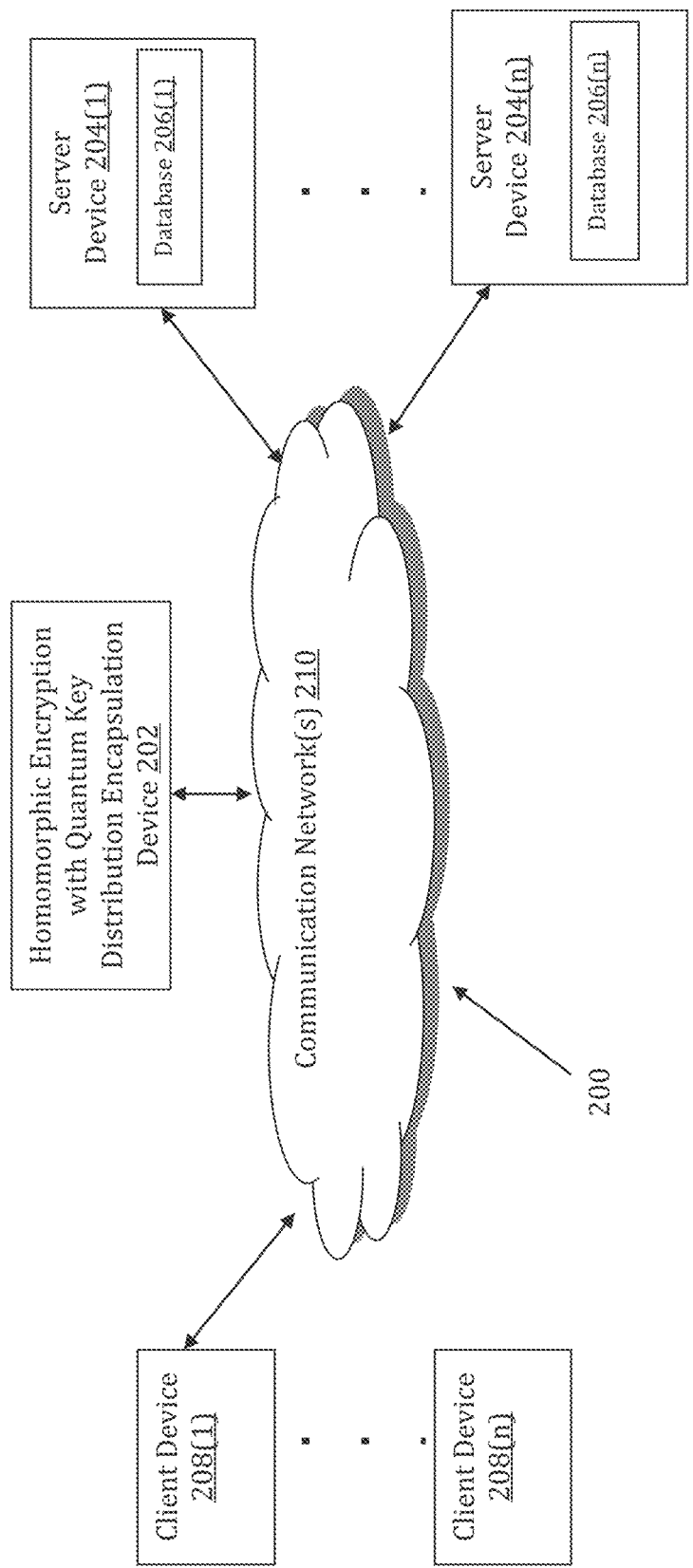
FIG. 2 illustrates an exemplary diagram of a network environment.

Referring to FIG. 2, a schematic of an exemplary network environment 200 for implementing a method for using quantum key distribution (QKD) encapsulation with respect to homomorphic encryption is illustrated. In an exemplary embodiment, the method is executable on any networked computer platform, such as, for example, a personal computer (PC).

The method for using quantum key distribution (QKD) encapsulation with respect to homomorphic encryption in a manner that is implementable in various computing platform environments may be implemented by a Homomorphic Encryption with Quantum Key Distribution Encapsulation (HE-QKDE) device 202. The HE-QKDE device 202 may be the same or similar to the computer system 102 as described with respect to FIG. 1. The HE-QKDE device 202 may store one or more applications that can include executable instructions that, when executed by the HE-QKDE device 202, cause the HE-QKDE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the HE-QKDE device 202 itself, may be located in virtual server(s) running in a cloud-based computing environment rather than being tied to one or more specific physical network computing devices. Also, the application(s) may be running in one or more virtual machines (VMs) executing on the HE-QKDE device 202. Additionally, in one or more embodiments of this technology, virtual machine(s) running on the HE-QKDE device 202 may be managed or supervised by a hypervisor.

In the network environment 200 of FIG. 2, the HE-QKDE device 202 is coupled to a plurality of server devices 204(1)-204(n) that hosts a plurality of databases 206(1)-206(n), and also to a plurality of client devices 208(1)-208(n) via communication network(s) 210. A communication interface of the HE-QKDE device 202, such as the network interface 114 of the computer system 102 of FIG. 1, operatively couples and communicates between the HE-QKDE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the HE-QKDE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and HE-QKDE devices that efficiently implement a method for using quantum key distribution (QKD) encapsulation with respect to homomorphic encryption.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 may include quantum network(s) and/or optical network(s). The communication network(s) 210 in this example may employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

The HE-QKDE device 202 may be a standalone device or integrated with one or more other devices or apparatuses, such as one or more of the server devices 204(1)-204(n), for example. In one particular example, the HE-QKDE device 202 may include or be hosted by one of the server devices 204(1)-204(n), and other arrangements are also possible. Moreover, one or more of the devices of the HE-QKDE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the HE-QKDE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to QKD methods and/or homomorphic methods, data that relates to QKD encapsulation methods, and data that relates to homomorphic encryption-based operations.

Although the server devices 204(1)-204(n) are illustrated as single devices, one or more actions of each of the server devices 204(1)-204(n) may be distributed across one or more distinct network computing devices that together comprise one or more of the server devices 204(1)-204(n) Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the HE-QKDE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the HE-QKDE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the HE-QKDE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the HE-QKDE device 202, the server devices 204(1)-204(n), or the client devices 208(1)-208(n), for example, may be configured to operate as virtual instances on the same physical machine. In other words, one or more of the HE-QKDE device 202, the server devices 204(1)-204(n), or the client devices 208(1)-208(n) may operate on the same physical device rather than as separate devices communicating through communication network(s) 210. Additionally, there may be more or fewer I-1E-QKDE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
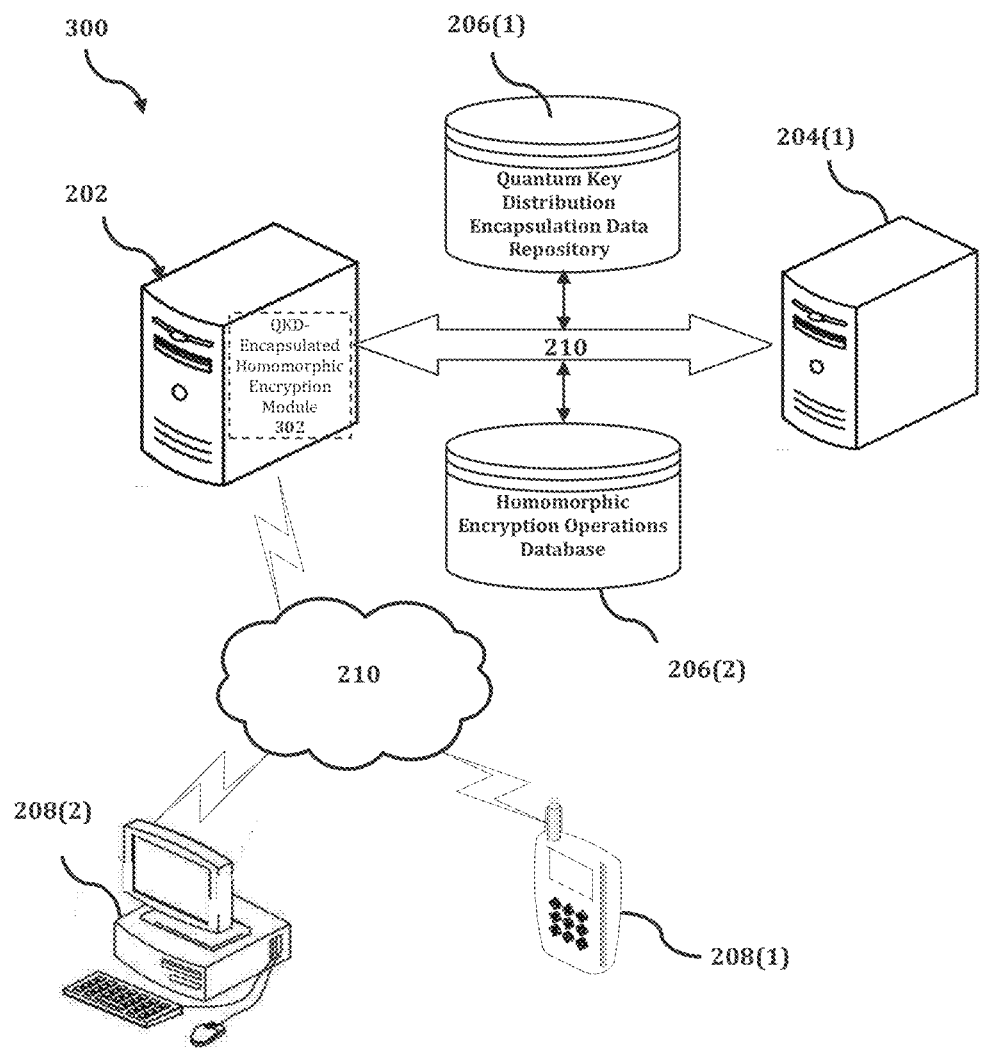
FIG. 3 shows an exemplary system for implementing a method for using quantum key distribution (QKD) encapsulation with respect to homomorphic encryption.

The HE-QKDE device 202 is described and shown in FIG. 3 as including a QKD-encapsulated homomorphic encryption module 302, although it may include other rules, policies, modules, databases, or applications, for example. As will be described below, the QKD-encapsulated homomorphic encryption module 302 is configured to implement a method for using quantum key distribution (QKD) encapsulation with respect to homomorphic encryption in an automated, efficient, scalable, and reliable manner.

An exemplary process 300 for implementing a method for using quantum key distribution (QKD) encapsulation with respect to homomorphic encryption by utilizing the network environment of FIG. 2 is shown as being executed in FIG. 3. Specifically, a first client device 208(1) and a second client device 208(2) are illustrated as being in communication with HE-QKDE device 202. In this regard, the first client device 208(1) and the second client device 208(2) may be "clients" of the HE-QKDE device 202 and are described herein as such. Nevertheless, it is to be known and understood that the first client device 208(1) and/or the second client device 208(2) need not necessarily be "clients" of the HE-QKDE device 202, or any entity described in association therewith herein. Any additional or alternative relationship may exist between either or both of the first client device 208(1) and the second client device 208(2) and the HE-QKDE device 202, or no relationship may exist.

Further, HE-QKDE device 202 is illustrated as being able to access a quantum key distribution encapsulation data repository 206(1) and a homomorphic encryption operations database 206(2). The QKD-encapsulated homomorphic encryption module 302 may be configured to access these databases for implementing a method for using quantum key distribution (QKD) encapsulation with respect to homomorphic encryption.

The first client device 208(1) may be, for example, a smart phone. Of course, the first client device 208(1) may be any additional device described herein. The second client device 208(2) may be, for example, a personal computer (PC) Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the HE-QKDE device 202 via broadband or cellular communication. Of course, these embodiments are merely exemplary and are not limiting or exhaustive.

Upon being started, the QKD-encapsulated homomorphic encryption module 302 executes a process for using quantum key distribution (QKD) encapsulation with respect to homomorphic encryption. An exemplary process for using quantum key distribution (QKD) encapsulation with respect to homomorphic encryption is generally indicated at flowchart 400 in FIG. 4.

Figure 4:
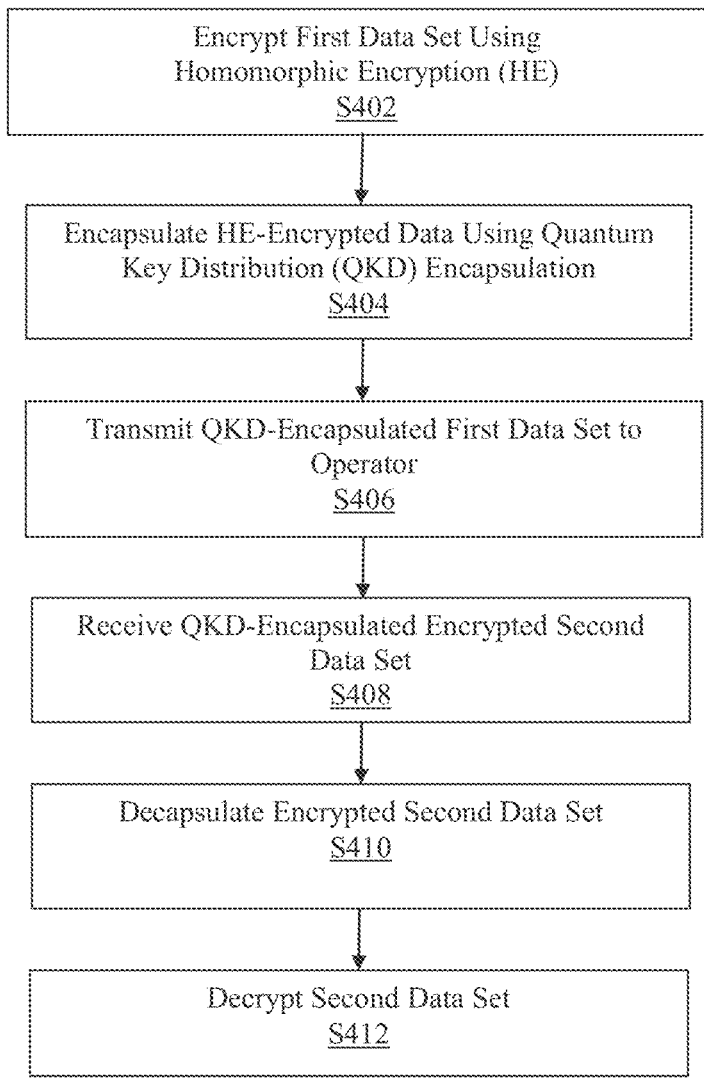
FIG. 4 is a flowchart of an exemplary process for implementing a method for using quantum key distribution (QKD) encapsulation with respect to homomorphic encryption.

In the process 400 of FIG. 4, at step S402, the QKD-encapsulated homomorphic encryption module 302 encrypts a first data set by using a homomorphic encryption (HE) technique. In an exemplary embodiment, the HE technique may include any one or more of a fully homomorphic encryption technique, a partially homomorphic encryption technique, a somewhat homomorphic encryption technique, and/or any other suitable type of homomorphic encryption technique.

At step S404, the QKD-encapsulated homomorphic encryption module 302 encapsulates the HE-encrypted first data set by using a quantum key distribution (QKD) encapsulation technique. According to an exemplary embodiment, the QKD encapsulation may be performed by using any one or more of a prepare-and-measure QKD encapsulation technique, an entanglement-based QKD encapsulation technique, and/or any other suitable type of QKD encapsulation technique.

At step S406, the QKD-encapsulated homomorphic encryption module 302 transmits the QKD-encapsulated and HE-encrypted first data set to a destination, such as, for example, a data operator. The transmission is made over at least one communication channel. In an exemplary embodiment, the transmission may be made over two channels, including an HE channel over which the QKD-encapsulated data is transmitted and a quantum channel over which a quantum key distribution is conducted in order to secure the data transmission. Alternatively, a single channel may be used for both the data transmission and the conducting of the quantum key distribution.

In an exemplary embodiment, the quantum key distribution may be conducted by using any one or more of a polarization-encoded method, a phase-encoded method, a discrete-variable method, a continuous variable method, and/or any other suitable type of quantum key distribution method.

In an exemplary embodiment, the communication channel(s) may include any one or more of a fiber-optic communication channel, a free space communication channel, and/or any other suitable type of communication channel.

At step S408, the QKD-encapsulated homomorphic encryption module 302 receives a QKD-encapsulated and H E-encrypted second data set from the operator. The second data set is a result of an operation that is executed by the data operator on the HE-encrypted first data set without having decrypted the data. When the QKD-encapsulated and HE-encrypted first data set is received by the data operator, a decapsulation operation is performed in order to remove the QKD encapsulation, and then the operation is executed in order to generate the second data set, which remains HE-encrypted. The data operator then encapsulates the HE-encrypted second data set using QKD encapsulation and then transmits the QKD-encapsulated data set to the original source of the first data set.

At step S410, the QKD-encapsulated homomorphic encryption module 302 decapsulates the HE-encrypted second data set. Then, at step S412, the QKD-encapsulated homomorphic encryption module 302 decrypts the second data set in order to recover the processed data.

Figure 5:
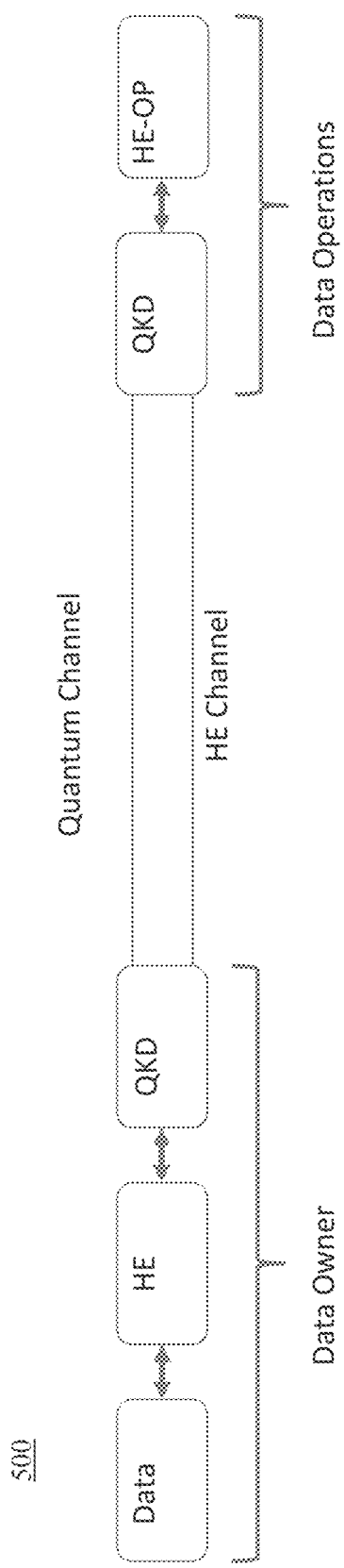
FIG. 5 is a block diagram of a system configured to implement a method for using QKD encapsulation with respect to homomorphic encryption that utilizes two communication channels for transmission between a data owner and a data operator, according to an exemplary embodiment.

FIG. 5 is a block diagram 500 of a system configured to implement a method for using QKD encapsulation with respect to homomorphic encryption that utilizes two communication channels for transmission between a data owner and a data operator, according to an exemplary embodiment.

Figure 6:
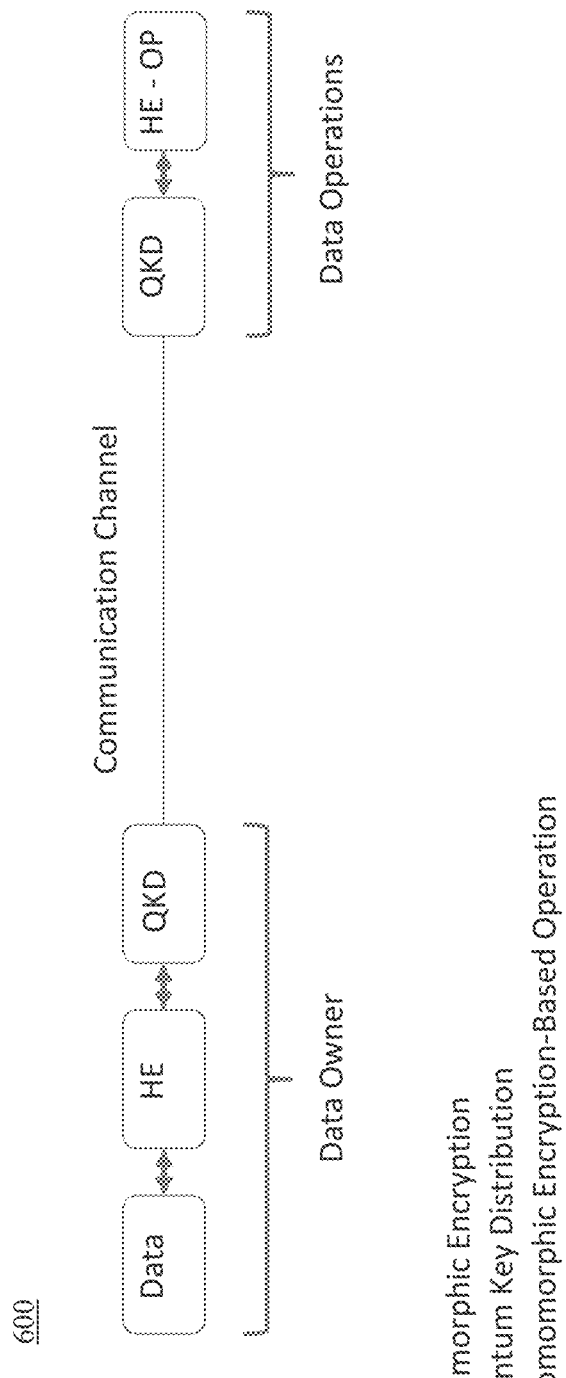
FIG. 6 is a block diagram of a system configured to implement a method for using QKD encapsulation with respect to homomorphic encryption that utilizes a single communication channel for transmission between a data owner and a data operator, according to an exemplary embodiment.

FIG. 6 is a block diagram 600 of a system configured to implement a method for using QKD encapsulation with respect to homomorphic encryption that utilizes a single communication channel for transmission between a data owner and a data operator, according to an exemplary embodiment.

Referring to FIG. 5, on the Data Owner side, the data is first encrypted via homomorphic encryption (HE). Then, the homomorphically-encrypted data is in turn encapsulated in a quantum key distribution (QKD)-protected layer and transmitted to the Data Operations side.

In FIG. 5, the QKD-encapsulated homomorphic encryption utilizes two channels for transmission, including a quantum channel for conducting a quantum key distribution and an HE channel for transmitting the QKD-encapsulated homomorphically-encrypted data, which is secured by the quantum key distribution.

Referring to FIG. 6, in another exemplary embodiment, both the conducting of the quantum key distribution and the transmitting of the QKD-encapsulated homomorphically-encrypted data may utilize the same communication channel.

On the Data Operations side, the QKD encapsulation is removed and the homomorphically-encrypted data is provided for a homomorphic encryption-based operation to be conducted. Upon completion of the operation, the homomorphically-encrypted data is QKD-encapsulated and transmitted back to the Data Owner side, in which the encapsulation and encryption operations done previously on the data is reversed and the data is recovered by the Data Owner.

According to an exemplary embodiment, the homomorphic encryption may be performed by using any one or more of a fully homomorphic encryption technique, a partially homomorphic encryption technique, a somewhat homomorphic encryption technique, and/or any other suitable type of homomorphic encryption technique.

According to an exemplary embodiment, the QKD encapsulation may be performed by using any one or more of a prepare-and-measure QKD encapsulation technique, an entanglement-based QKD encapsulation technique, and/or any other suitable type of QKD encapsulation technique.

According to an exemplary embodiment, the quantum key distribution may be conducted by using any one or more of a polarization-encoded method, a phase-encoded method, a discrete-variable method, a continuous variable method, and/or any other suitable type of quantum key distribution method.

According to an exemplary embodiment, the communication channel(s) may include any one or more of a fiber-optic communication channel, a free space communication channel, and/or any other suitable type of communication channel.

Accordingly, with this technology, an optimized process for using quantum key distribution (QKD) encapsulation with respect to homomorphic encryption is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for processing encrypted data, the method being implemented by at least one processor, the method comprising:
    encrypting, by the at least one processor, a first data set;
    encapsulating, by the at least one processor, the encrypted first data set in a protective layer; and
    transmitting, by the at least one processor, the encapsulated encrypted first data set to a destination over at least one communication channel,
    wherein the encrypting is performed by using a homomorphic encryption (HE) technique, and
    wherein the encapsulating is performed by using a quantum key distribution (QKD) encapsulation technique to generate a QKD-protected layer,
    wherein the at least one communication channel includes a non-quantum channel over which the QKD-encapsulated encrypted first data set is transmitted and a quantum channel over which a quantum key distribution is conducted.

2. The method of claim 1, further comprising:
    receiving, from the destination, an encapsulated encrypted second data set;
    decapsulating, by the at least one processor, the received encrypted second data set; and
    decrypting, by the least one processor, the decapsulated second data set.

3. The method of claim 1, wherein the quantum key distribution includes at least one from among a polarization-encoded quantum key distribution, a phase-encoded quantum key distribution, a discrete-variable quantum key distribution, and a continuous variable quantum key distribution.

4. The method of claim 1, wherein the QKD encapsulation technique includes at least one from among a prepare-and-measure technique and an entanglement-based technique.

5. The method of claim 1, wherein the encrypting is performed by using at least one from among a fully homomorphic encryption technique, a partially homomorphic encryption technique, and a somewhat homomorphic encryption technique.

6. The method of claim 1, wherein the at least one communication channel includes at least one from among a fiber-optic communication channel and a free space communication channel.

7. A computing apparatus for processing encrypted data, the computing apparatus comprising:
a processor;
a memory; and
a communication interface coupled to each of the processor and the memory,
wherein the processor is configured to:
encrypt a first data set by using a homomorphic encryption (HE) technique;
encapsulate the encrypted first data set in a protective layer by using a quantum key distribution (QKD) encapsulation technique to generate a QKD-protected layer; and
transmit, via the communication interface, the encapsulated encrypted first data set to a destination over at least one communication channel,
wherein the at least one communication channel includes a non-quantum channel over which the QKD-encapsulated encrypted first data set is transmitted and a quantum channel over which a quantum key distribution is conducted.

8. The computing apparatus of claim 7, wherein the processor is further configured to:
receive, from the destination via the communication interface, an encapsulated encrypted second data set;
decapsulate the received encrypted second data set; and
decrypt the decapsulated second data set.

9. The computing apparatus of claim 7, wherein the quantum key distribution includes at least one from among a polarization-encoded quantum key distribution, a phase-encoded quantum key distribution, a discrete-variable quantum key distribution, and a continuous variable quantum key distribution.

10. The computing apparatus of claim 7, wherein the QKD encapsulation technique includes at least one from among a prepare-and-measure technique and an entanglement-based technique.

11. The computing apparatus of claim 7, wherein the processor is further configured to encrypt the first data set by using at least one from among a fully homomorphic encryption technique, a partially homomorphic encryption technique, and a somewhat homomorphic encryption technique.

12. The computing apparatus of claim 7, wherein the at least one communication channel includes at least one from among a fiber-optic communication channel and a free space communication channel.

13. The computing apparatus of claim 7, wherein the processor includes at least one from among a quantum processor and an optical processor.

14. A method for processing encrypted data, the method being implemented by at least one processor, the method comprising:
receiving, by the at least one processor from a source, a first set of data that has been encrypted by using a homomorphic encryption (HE) technique and encapsulated by using a quantum key distribution (QKD) encapsulation technique;
decapsulating, by the at least one processor, the encrypted first data set;
executing, by the at least one processor, an HE-based operation on the encrypted first data set in order to generate an encrypted second data set;
encapsulating, by the at least one processor, the encrypted second data set by using the QKD encapsulation technique; and
transmitting, by the at least one processor to the source, the QKD-encapsulated encrypted second data set over at least one communication channel,
wherein the at least one communication channel includes a non-quantum channel over which the QKD-encapsulated encrypted first data set is transmitted and a quantum channel over which a quantum key distribution is conducted.

15. The method of claim 14, wherein the quantum key distribution includes at least one from among a polarization-encoded quantum key distribution, a phase-encoded quantum key distribution, a discrete-variable quantum key distribution, and a continuous variable quantum key distribution.

16. The method of claim 14, wherein the QKD encapsulation technique includes at least one from among a prepare-and-measure technique and an entanglement-based technique.

17. The method of claim 14, wherein the first set of data has been encrypted by using at least one from among a fully homomorphic encryption technique, a partially homomorphic encryption technique, and a somewhat homomorphic encryption technique.

18. The method of claim 14, wherein the at least one communication channel includes at least one from among a fiber-optic communication channel and a free space communication channel.

* * * * *